United States Patent
Fennel et al.

(10) Patent No.: US 6,901,789 B1
(45) Date of Patent: Jun. 7, 2005

(54) METHOD FOR DETERMINING PARAMETERS

(75) Inventors: Helmut Fennel, Bad Soden (DE); Michael Latarnik, deceased, late of Friedrichsdorf (DE); by Christine Latarnik, legal representative, Friedrichsdorf (DE); by Eva-Maria Latarnik, legal representative, Friedrichsdorf (DE); by Syllva Latarnik, legal representative, Friedrichsdorf (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 09/936,638

(22) PCT Filed: Mar. 16, 2000

(86) PCT No.: PCT/EP00/02347

§ 371 (c)(1),
(2), (4) Date: Dec. 12, 2002

(87) PCT Pub. No.: WO00/55021

PCT Pub. Date: Sep. 21, 2000

(30) Foreign Application Priority Data

Mar. 17, 1999 (DE) .................. 199 11 788
Mar. 14, 2000 (DE) .................. 100 11 801

(51) Int. Cl.[7] .......................... G01N 11/00
(52) U.S. Cl. .................. 73/54.01; 73/54.06; 73/54.14; 73/61.47; 73/64.46; 73/39; 73/121; 701/70; 701/71; 701/72
(58) Field of Search ............... 73/54.06, 121, 73/39, 54.01, 54.14, 61.47, 64.46; 701/70, 701/72, 71; 303/121

(56) References Cited

U.S. PATENT DOCUMENTS

| | | | | |
|---|---|---|---|---|
| 4,205,883 A | * | 6/1980 | Gaiser | 303/9.68 |
| 4,761,042 A | * | 8/1988 | Seibert et al. | 303/122.1 |
| 5,115,678 A | * | 5/1992 | Ozaki et al. | 73/117 |
| 5,188,433 A | * | 2/1993 | Reinartz et al. | 303/191 |
| 5,767,397 A | | 6/1998 | Eisele | |
| 5,809,444 A | * | 9/1998 | Hadeler et al. | 701/72 |
| 6,019,436 A | * | 2/2000 | Siepker | 303/13 |
| 6,203,123 B1 | * | 3/2001 | Oyama | 303/191 |
| 6,244,676 B1 | | 6/2001 | Watanabe et al. | |
| 6,418,906 B1 | * | 7/2002 | Cornell et al. | 123/322 |
| 6,520,601 B1 | * | 2/2003 | Kahl et al. | 303/167 |
| 6,655,753 B1 | * | 12/2003 | Fuhrer | 303/125 |

FOREIGN PATENT DOCUMENTS

| | | | | |
|---|---|---|---|---|
| DE | WO00/46087 | * | 8/2000 | B60T 8/00 |
| EP | WO 98/23473 | | 6/1998 | |
| EP | 921 047 | | 6/1999 | |

OTHER PUBLICATIONS

English Abstract of DE4408879 from espacenet.com.
English Abstract of DE19654586 from espacenet.com.
English Abstract of DE19651154 from espacenet.com.
English Abstract of DE19920448 from espacenet.com.
English Abstract of DE19603909 from espacenet.com.

* cited by examiner

Primary Examiner—Hezron Williams
Assistant Examiner—André K. Jackson

(57) ABSTRACT

A method for determining parameters for the viscosity or temperature of a brake fluid of a vehicle by way of a predetermined pressure build-up within time limits in at least one defined section of a brake circuit and for detecting a pressure in the said section and/or a time which is required for the build-up of the said pressure.

11 Claims, 3 Drawing Sheets

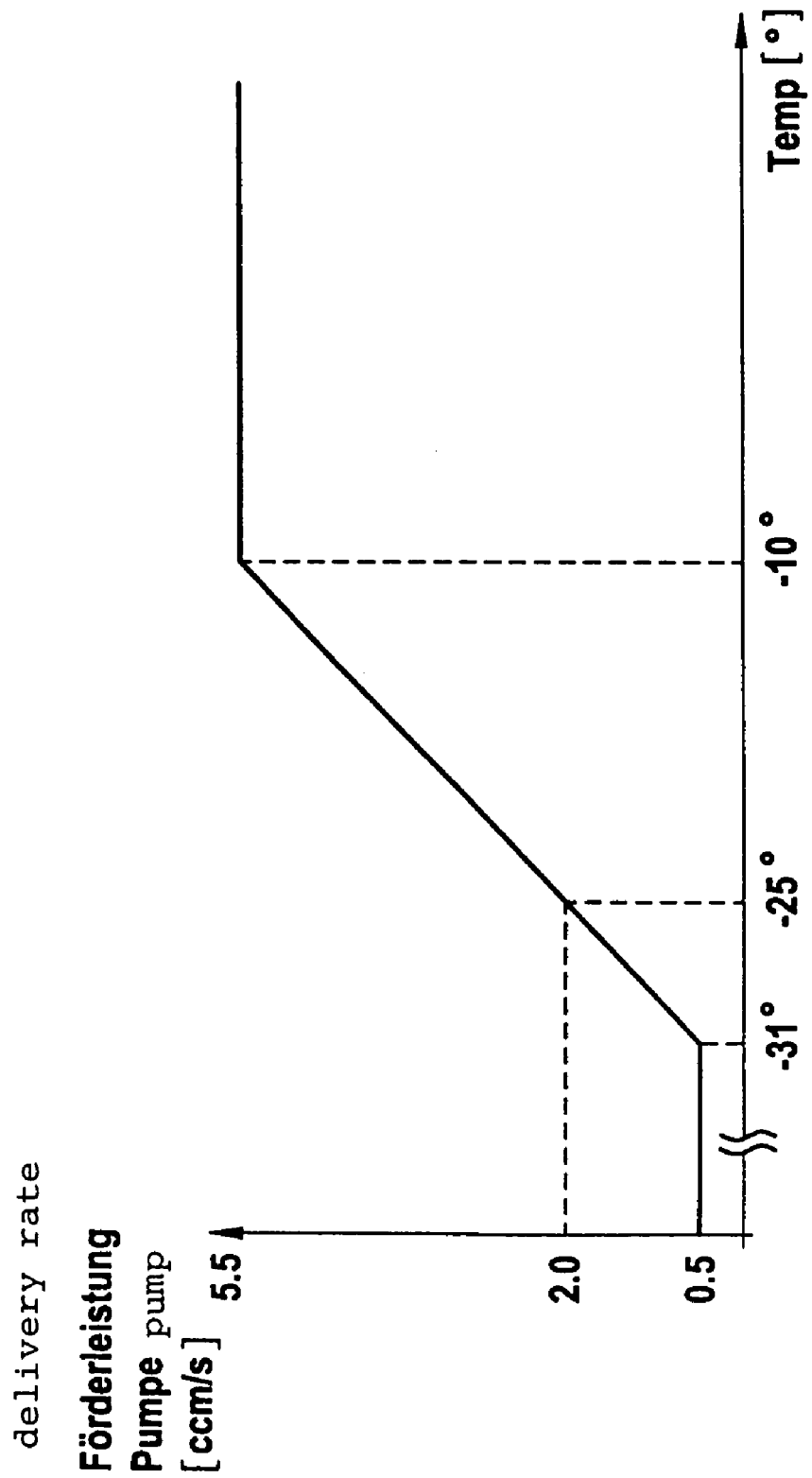

METHOD FOR DETERMINING PARAMETERS

BACKGROUND OF THE INVENTION

The present invention relates to a method for determining parameters for the viscosity and/or temperature of a brake fluid of a vehicle.

It is known that the viscosity of a brake fluid or hydraulic fluid is greatly responsive to temperatures. High viscosity at low fluid temperatures, i.e., at a low temperature below −10 degrees C., for example, in the starting period of an automotive vehicle impairs the controllability of the brake pressure of a controlled hydraulic brake system. It is problematic when the brake fluid is used in a system having a driving stability control function, which operates without being influenced by the driver, and fluid must flow especially quickly from the brake fluid reservoir to a wheel brake. With temperatures dropping, the viscosity of the brake fluid rises at a high rate. At very low temperatures, the result is that the brake fluid cannot flow at a sufficiently quick rate and, in addition, the loss in pressure in the pipe line increases with rising viscosity. These obstacles cause a slower brake intervention. In driving stability control, however, there is the general demand of effecting a quick brake intervention. To solve this problem, devices have already been proposed which provide an auxiliary pressure source or a precharging pump. Because this entails considerable extra cost, the use of these devices is increasingly avoided.

In view of the above, an object of the present invention is to ensure, with little effort, the functioning of a hydraulic vehicle brake system with all its partial functions, such as anti-lock function, traction slip function, and driving stability function, at any temperatures, even when exposed to very low outside temperatures.

SUMMARY OF THE INVENTION

Preferably, the method of this invention is used in a driving-dynamics control system which serves to assist the driver of a vehicle in critical driving situations. 'Vehicle' in this context refers to an automotive vehicle with four wheels which is equipped with a hydraulic brake system. In the hydraulic brake system, brake pressure can be built up by the driver by means of a pedal-operated master cylinder. Each wheel has a brake with which at least one inlet valve and one outlet valve is associated. By way of the inlet valves, the wheel brakes are connected to the master cylinder, while the outlet valves lead to an unpressurized reservoir or low-pressure accumulator. Finally, there is provision of an auxiliary-pressure source, generally, a motor-and-pump assembly which is able to build up pressure in the wheel brakes even independently of the position of the brake pedal. The inlet and outlet valves are electromagnetically operable for the pressure control in the wheel brakes. Four rotational speed sensors, one per wheel, one yaw rate sensor, one transverse acceleration sensor, one steering angle sensor, and at least one pressure sensor for the brake pressure applied indirectly or directly by the brake pedal is provided in order to detect conditions related to driving dynamics. An electronic control system which typically forms an assembly along with a hydraulic block, in which the valves and the pump are accommodated, and on the one side of which the pump motor is arranged, controls the dynamic driving conditions of the vehicle during unstable travel. Thus, the function of the driving stability control system in critical situations includes imparting the vehicle behavior that is desired by the driver to the vehicle, within physical limits.

In ESP control systems (ESP=Electronic Stability Program), a pressure requirement for each individual wheel is calculated from the detected instability of the vehicle which is necessary to bring the vehicle back to the course desired by the driver. Yaw torque control ensures stable driving conditions in a cornering maneuver. Different vehicle reference models, e.g. the single-track model, can be relied on for yaw torque control. In ESP control systems, input quantities that result from the course desired by the driver (e.g. the steering angle, the speed, etc.) are always sent to the vehicle model circuit which determines a nominal value for the yaw rate from these input quantities and from parameters characteristic of the driving behavior of the vehicle as well as from quantities predetermined by ambient conditions (coefficient of friction of the roadway, side wind). The nominal yaw rate is then compared with the actual yaw rate measured. The yaw rate difference is converted into a yaw torque which represents the input quantity of a distribution logic by means of a so-called yaw torque controller or, more precisely, a yaw torque control law. The distribution logic itself determines the brake pressure to be applied to the individual wheel brakes in dependence on a brake pressure model. The inlet and outlet valves are actuated by a pressure control which converts pressure quantities into valve actuation signals in dependence on the real pressure increase and pressure decrease characteristics in the wheel brakes reproduced in the pressure model. The pressure model receives input quantities required herefor and, based on these and on system parameters, reproduces the pressure that prevails in the brake. More particularly, the pressure model can receive the control signals which influence the brake pressure on the respective brake under review, that is e.g. signals for the inlet valves, the outlet valves, for the hydraulic pump, or similar components. From these signals and from system parameters (for example, line cross-sections, switching characteristics, etc.), the pressure model can reproduce the pressure in the wheel brakes in parallel to the build-up of the wheel pressure so that the control circuit can be closed by outputting the pressure determined in this manner by way of the pressure model.

Prior art systems suffer from the difficulty of taking into consideration the influence of varying temperatures. The viscosity of brake fluid drops at low temperatures. This changes an input quantity which is taken into account in the pressure model when reproducing the wheel pressure, the pump delivery capacity or the supply volume of the pump, which increases or reduces in dependence on the temperature-responsive viscosity of the brake fluid.

To avoid discrepancies between the wheel pressure reproduced in the pressure model and the actual wheel pressure, it would be desirable to adapt the parameters that are stored in the pressure model or made available to the pressure model, especially the pump delivery capacity.

A first design of the present invention, therefore, discloses a method for determining parameters for the viscosity and/or temperature of a brake fluid of a vehicle by way of a predetermined pressure build-up within time limits in at least one defined section of a brake circuit and for detecting a pressure in the section and/or a time which is required for the build-up of the said pressure. The change-over valve is opened and the inlet valve closed for pressure build-up of the measuring pressure. Fluid is conducted from the master cylinder into the brake line by actuating the pump. The separating valve is closed during pressure fluid delivery. According to the present invention, the separating valve is opened after a predetermined time interval, and the measuring pressure (pressure pulse) generated by the pressure build-up is sensed between the inlet valve which is closed and the master cylinder. Because the separating valve arranged in the measurement section is open when the pressure is detected, a pressure sensor which is arranged in the brake line before the master brake cylinder between the change-over valve and the separating valve can sense the temperature-responsive measuring pressure. The temperature value of the brake fluid determined from the dynamic pressure is sent as an input quantity to the pressure model for the reproduction of the actual brake pressures. The parameters for the viscosity or temperature, respectively, can be determined from the time variation and/or the magnitude of the measured pressure in the defined section of the brake circuit.

By means of the parameters provided to the brake pressure model, parameters calculated, or input, or stored in the pressure model, such as the pump delivery capacity and values derived from the parameters such as valve actuation times, are modified or corrected corresponding to the determined parameters for the viscosity or temperature of the brake fluid. In dependence on the temperature values derived from the measuring pressure values, the pump delivery capacity stored in the pressure model is corrected and, thus, the pressure increase and pressure decrease curves are modified by means of which the actual wheel pressures are reproduced. The valves of the brake system are actuated e.g. for a longer time during brake pressure build-up due to the modified pressure increase and pressure decrease curves of the pressure model at a higher viscosity of the brake fluid, in particular below a temperature of –10° C., for example, at –15° C. The result is that the actual wheel pressure reaches the brake pressure demanded by the driving dynamics control at an earlier time.

In another embodiment of the present method, the time is detected which passes starting with the build-up of the measuring pressure until the commencement of a pressure rise or until the attaining of a limit value, and the parameter for the viscosity or temperature is determined in dependence on the time period found. The determination of time can be triggered with the switching signal of the separating valve. This determination of the temperature or the viscosity of the brake fluid plotted against the time variation of the measuring pressure is based on the principle that, with a brake fluid at normal temperatures (down to roughly –10° C. brake fluid temperature) and, thus, at a low viscosity, the build-up of measuring pressure can be detected at an earlier point of time than when the brake fluid is at low temperatures (below roughly –10° C. brake fluid temperature) and, thus, at a high viscosity. The pressure rise at low temperatures takes place at a later point of time than the detection of the measured pressure in a predetermined normal temperature range. The time span found can be a direct standard for the viscosity or the temperature of the brake fluid, or can be determined by way of a comparison with quantities stored in tables or characteristic curves.

In another embodiment, the maximum pressure of the brake fluid is detected. This embodiment of the present invention is based on the principle that the master cylinder connected to a brake fluid reservoir in the brake fluid circuit represents a resistor in front of which dynamic pressure develops and which, at low temperatures, causes a maximally higher brake fluid pressure in the section of the brake circuit under review than at lower ambient or outside temperatures and, thus, a lower viscosity of the brake fluid.

Further, the present invention discloses detecting the pressure variation as a function of time and detecting the time until the beginning of the pressure rise (as described above) and the maximum pressure (as described above) or the pressure variation after switch-on of the pump that delivers the brake fluid or after the opening of the separating valve, and determining the parameters for the viscosity or temperature of the brake fluid in dependence on limit values, or curves of limit values, or tables or characteristic curves, or models previously stored in the brake pressure model.

To determine parameters for the viscosity or temperature of the brake fluid, it is proposed to open the change-over valve in particular shortly after the start of the vehicle, to close the inlet valve(s), and to activate the pump for a predetermined short time; subsequently, to close the change-over valve of the wheel brakes, open the separating valve and evaluate the signals of the pressure sensor in the control system which lies directly in front of the master cylinder in the brake line. The parameters produced from the time variation of the measured pressure values are stored in an evaluating unit of the driving dynamics controller, which can be a part of the brake pressure model, and serve to modify the pump delivery capacity memorized in the pressure model.

Of course, it is also possible to take into account only the time variation or the pressure variation in the section under review for the determination of parameters, and the respectively different parameter is made the basis of plausibility reflections.

One embodiment of the present invention is illustrated in the accompanying drawings and will be described in detail in the following.

BRIEF DESCRIPTION OF THE DRAWINGS

FIG. 3 is the dependency of the pump delivery capacity on the temperature of the brake fluid.

DETAILED DESCRIPTION OF THE INVENTION

Figure 1:
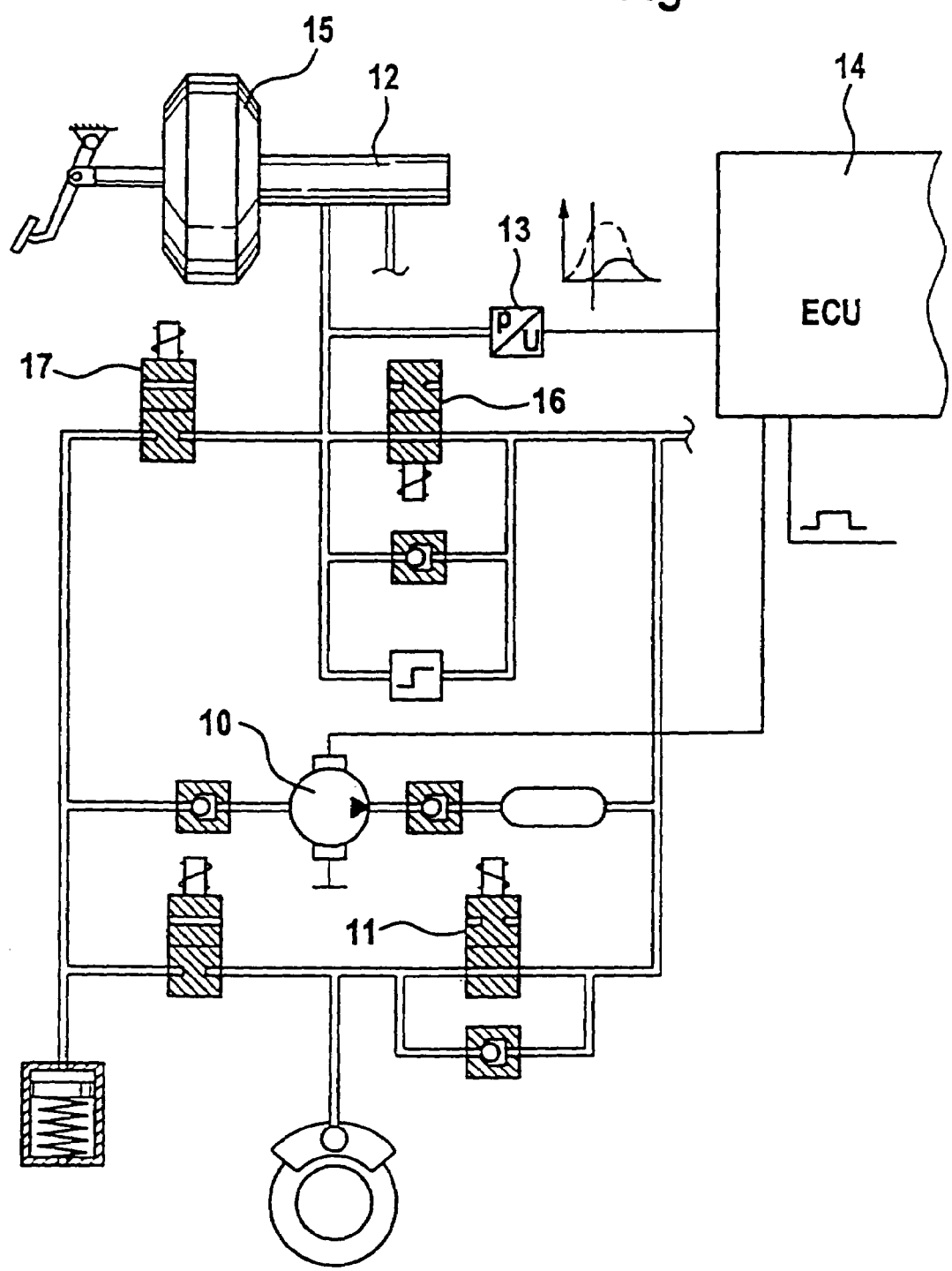
FIG. 1 is a view of a circuit of the present invention for determining the parameters.
Figure 2A:
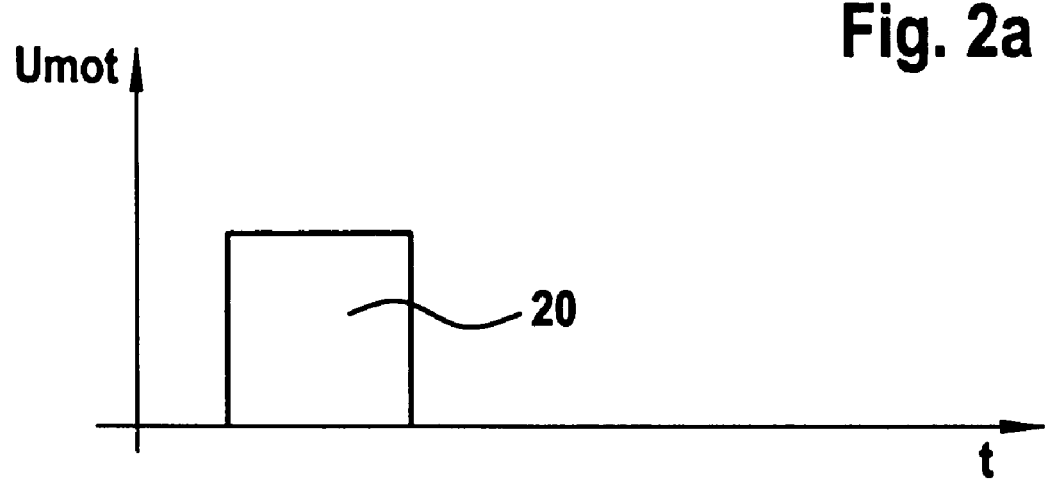
FIG. 2a is a motor voltage/time diagram.
Figure 2B:
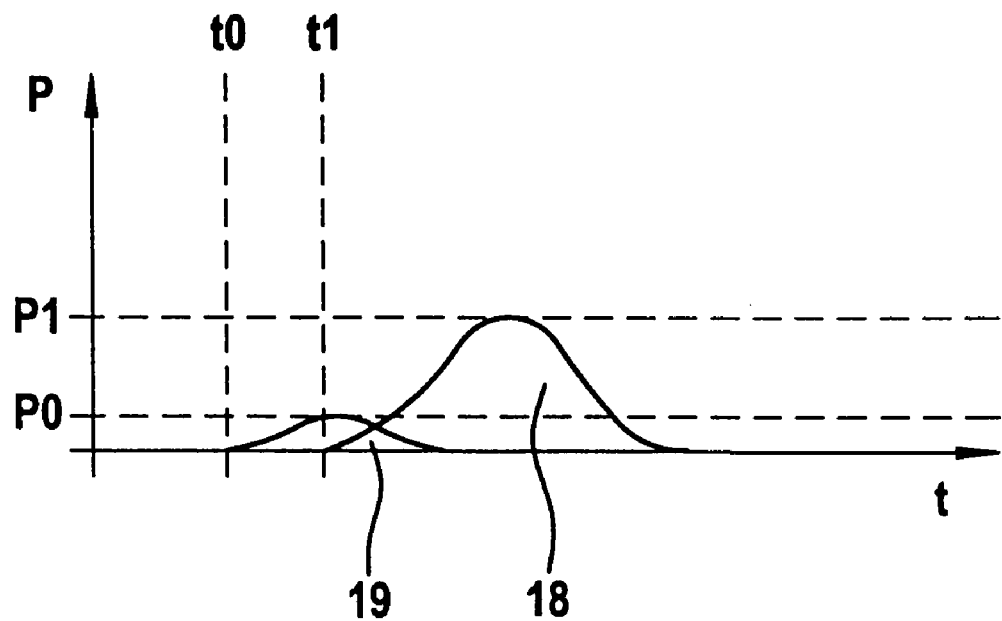
FIG. 2b is a pressure/temperature diagram.

To determine parameters for the viscosity or the temperature of the brake fluid, it is disclosed to open the change-over valve 17 shown in FIG. 1, especially shortly after the start of the vehicle, and then close the inlet valve 11 and activate the pump 10 for a predetermined short interval, and to supply brake fluid from the master cylinder 12 into the brake line. To detect the measuring pressure, the change-over valve 17 is closed and the separating valve 16 opened, and the signals of the pressure sensor 13 that is arranged in the brake line directly in front of the master cylinder 12 are evaluated in the electronic control unit (ECU) system 14. The hydraulic circuit illustrated in FIG. 1 represents a subarea of a prior art brake circuit in which the brake force booster is designated by reference numeral 15, the separating valve by 16 and the change-over valve by 17. A known brake circuit is illustrated in DE 196 48 596 which is a part of the present description. FIGS. 2a and 2b show the time variation (FIG. 2b) of the brake fluid in dependence on the motor voltage pulse. As the pressure curves of FIG. 2b show, the result of actuation of the motor of pump 10 by means of a pulse 20 are dependencies on the temperature or viscosity in the pressure variation of the pressure measured with the pressure sensor 13 in the defined section of the brake circuit, which is produced between the closed inlet valve 11, the open separating valve 16, the closed change-over valve 17 and the master cylinder. The pressure curve 18 represents a pressure variation at low temperatures, pressure curve 19 represents a pressure variation at normal temperatures. The point of time of the pressure build-up at low temperatures is later, at time T1, and causes a higher maximum dynamic pressure P1. At temperatures up to −10 degrees C., the point of time of the pressure build-up is earlier, i.e., at time T0, and causes a lower maximum dynamic pressure P0. Parameters which represent the temperature of the brake fluid are produced by way of the time variation and/or the magnitude of the measured pressure value. These parameters are memorized in the pressure model and serve for the modification of the pressure increase of pressure decrease characteristic curves which are produced in the pressure model by way of the modification of the pump delivery capacity. The pump delivery capacity memorized in the pressure model of the controller 14 can be modified in dependence on the temperature of the brake fluid that is determined by way of the measuring pressure, or in dependence on a temperature threshold value by taking correction factors into account. FIG. 3 shows the relationship of the pump delivery capacity influenced by the temperature of the brake fluid and, thus, the viscosity. When the temperature of the brake fluid drops below −10° C., the capacity of the pump declines almost proportionally to the temperature. Of course, the method may also be employed in other, e.g. non-linear, dependencies between the pump delivery capacity and the temperature of the brake fluid.

The wheel pressure reproduced in the pressure model is adapted to the brake pressure that is actually introduced into the wheel brakes, by way of the changes of valve actuation signals, for example.

We claim:

1. A method for determining parameters for the viscosity of a brake fluid as it is affected by temperature of a vehicle brake circuit for a predetermined pressure build-up within time limits comprising the steps of:
    generating a pressure build-up within time limits in at least one defined section of said brake circuit;
    detecting in the at least one defined section of said brake circuit the pressure build-up in said section;
    measuring at least one of a magnitude of said pressure or a time which is required to build up said pressure; and
    relating said magnitude of said pressure or said time to said viscosity.

2. A method as claimed in claim 1, further comprising that the time which is required to build-up said pressure is determined by way of switching valves of said brake circuit which initiate a pressure build-up.

3. A method as claimed in claim 1, wherein the maximum of said magnitude of said pressure is determined.

4. A method as claimed in claim 1, wherein said magnitude of said pressure is determined as a function of time.

5. A method as claimed in claim 1, wherein said at least one of said magnitude or time of said pressure is determined after activation of a pump of said brake circuit delivering the brake fluid or after opening of a valve of said brake circuit.

6. A method for controlling the driving stability of a vehicle, wherein the input quantities which may include inputs of steering angle and vehicle reference speed which are substantially defined by a roadway driving condition are converted into the nominal value of a yaw rate quantity due to a vehicle model fixed by operands and said quantities are compared with the actual value of the yaw rate quantity of said vehicle measured by means of sensors, wherein the difference value found is sent to a control law in which a torque quantity is calculated which serves to fix pressure quantities that generate an additional yaw torque by way of wheel brakes of the vehicle to bring the measured yaw rate quantity in conformity with the calculated yaw rate quantity, comprising the steps of:
    comparing the pressure quantities with pressure quantities determined in a pressure model;
    determining the viscosity of brake fluid of a brake circuit of said vehicle by detecting in at least one defined section of said brake circuit a pressure in said section and measuring at least one of a magnitude of said pressure or a time which is required to build up said pressure; and
    evaluating or modifying the pressure quantities determined in the pressure model as a function of the viscosity of the braking fluid.

7. A method as claimed in claim 6, wherein the modified or evaluated pressure quantities are converted into valve actuation signals, and brake valves of the wheel brakes of said vehicle are actuated in response to the said signals.

8. The method of claim 1, wherein the step of generating a pressure build-up includes switching valves and running a pump to generate the pressure build-up.

9. The method of claim 1, wherein the step of calculating the viscosity includes comparing the measured magnitude of the pressure to stored values in a database.

10. The method of claim 1, wherein the step of measuring the magnitude of the pressure includes the step of opening a valve at the boundary of the at least one defined section of the brake circuit and measuring the pressure pulse after the opening of the valve.

11. The method of claim 1, wherein the step of generating a pressure build-up is performed for a predetermined amount of time.

* * * * *